May 3, 1966 G. A. HILL ETAL 3,248,938
FLUID PRODUCING AND TESTING SYSTEM FOR PETROLEUM
RESERVOIR FORMATIONS
Original Filed April 21, 1961 2 Sheets-Sheet 1
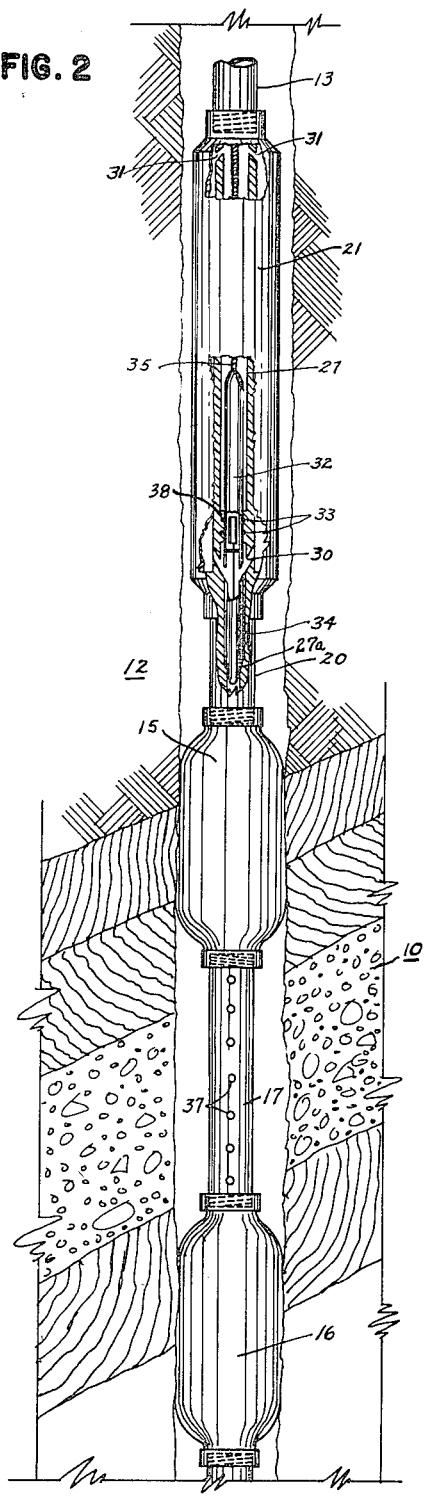
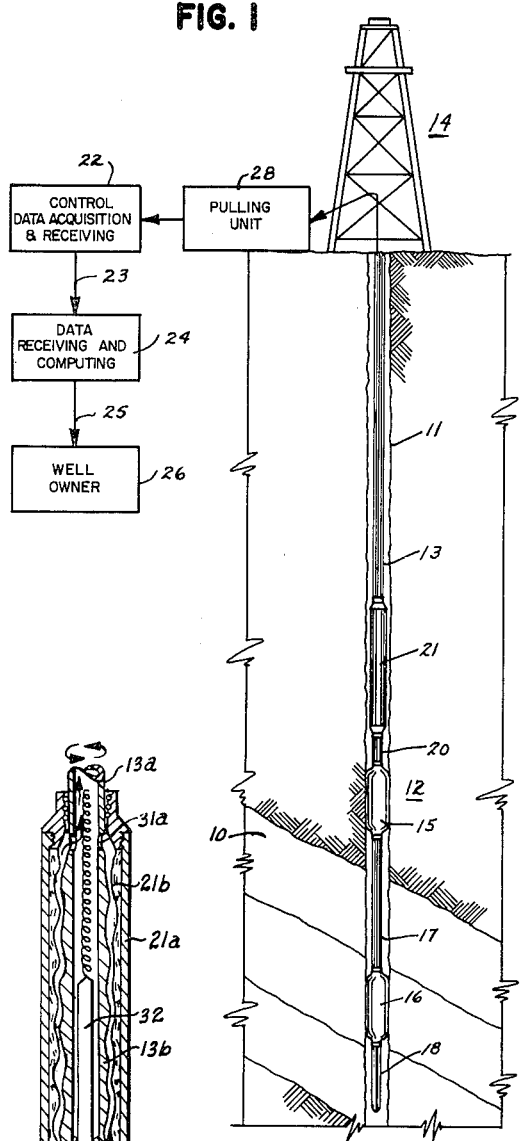
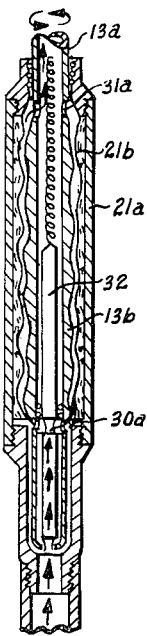
*INVENTORS*
GILMAN A. HILL
WILLIAM A. COLBURN
BY
*ATTORNEYS*

May 3, 1966 G. A. HILL ETAL 3,248,938
FLUID PRODUCING AND TESTING SYSTEM FOR PETROLEUM
RESERVOIR FORMATIONS
Original Filed April 21, 1961 2 Sheets-Sheet 2
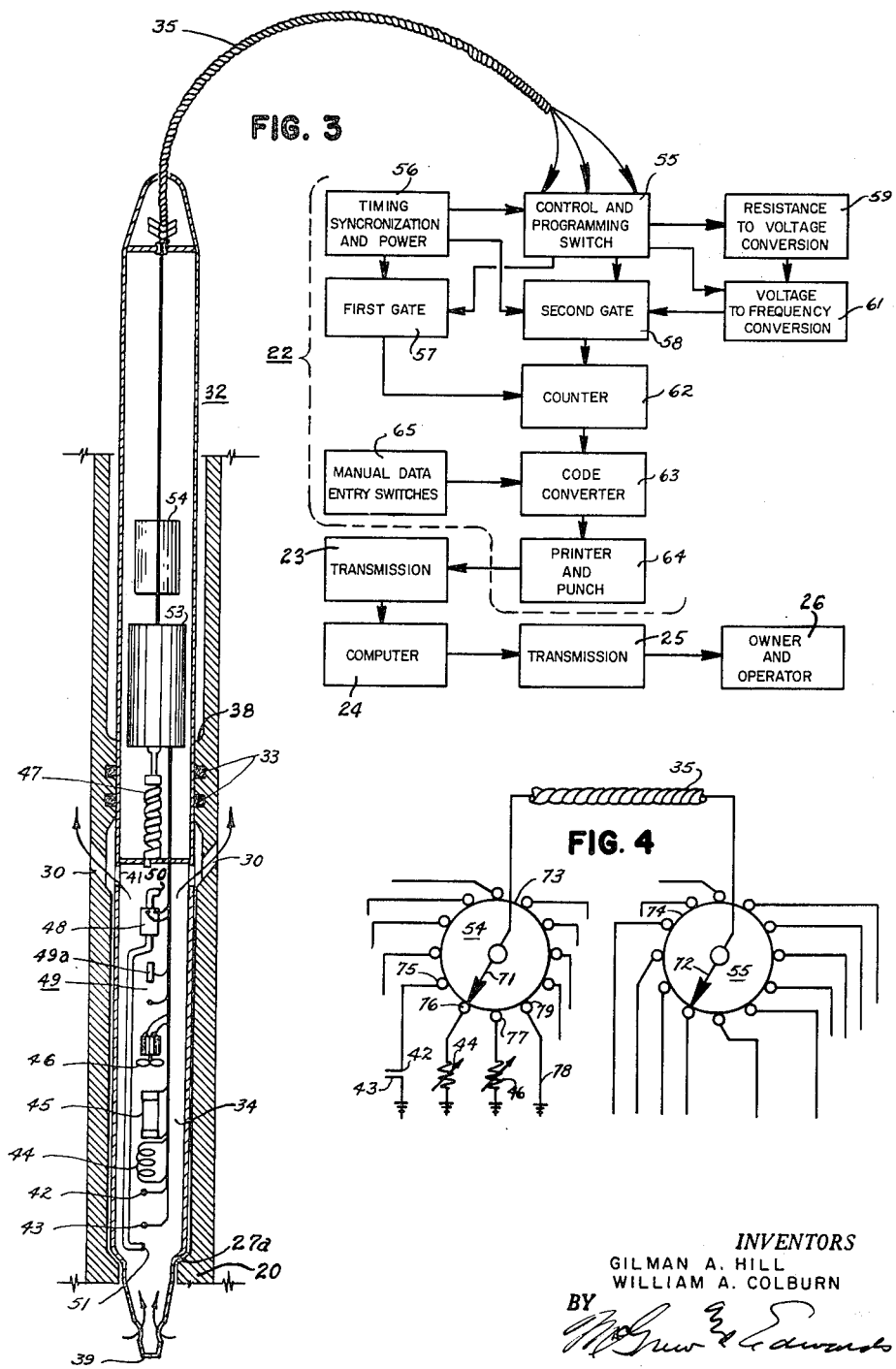
INVENTORS
GILMAN A. HILL
WILLIAM A. COLBURN
BY
ATTORNEYS

United States Patent Office 3,248,938
Patented May 3, 1966

3,248,938
FLUID PRODUCING AND TESTING SYSTEM FOR PETROLEUM RESERVOIR FORMATIONS
Gilman A. Hill, Englewood, and William A. Colburn, Denver, Colo., assignors to Petroleum Research Corporation, Denver, Colo., a corporation of Colorado
Continuation of application Ser. No. 104,669, Apr. 21, 1961. This application Oct. 4, 1965, Ser. No. 492,511
6 Claims. (Cl. 73—155)

This application is a continuation of copending application Serial No. 104,669, filed April 21, 1961, by the present applicants.

This invention relates to the testing and evaluation of petroleum reservoir formations and particularly to an apparatus for determining in rapid succession on a repetitive cycle the values of a plurality of characteristic properties of the fluids produced at controlled rates, volumes and times from each of a series of selected intervals along a well bore.

Various types of instruments and procedures have been employed heretofore in efforts to secure information for the purpose of evaluating oil reservoir formations. These efforts have met with some degree of success but have been costly and time consuming and have not been complete or fully accurate or reliable for many applications. For example, the standard drill-stem test employs a pressure-sensitive downhole recording instrument to record the pressure of the fluid produced from the formation at a declining but uncontrolled rate and of uncontrolled limited volume. Furthermore, after testing one formation, the entire string of drill pipe and the testing tools must be removed from the hole, reassembled, and put back in the hole before another test of any formation can be made. The instruments employed in these standard tests have required mechanisms such as clockwork for driving the recording chart in the downhole instrument chamber and are dependent upon the accurate operation of such mechanisms for the full period of the test, and the degree of accuracy of the operation cannot be determined until the mechanism is brought to the surface along with the entire string of drill pipe and testing tools. In many cases, the produced fluid sample cannot be identified until most of the drill pipe, the lower portion of which contains the sample, has been pulled to the surface.

Also, there have been developed wire-line-operated fluid samplers which are capable of producing a very small volume of fluid from the reservoir without using drill pipe. However, the very small volume of fluid produced at uncontrolled rates in these fluid samplers does not provide an adequate basis for complete evalution of the formation and in some instances may not obtain a representative sample of the formation fluid.

Surface-recording downhole pressure measuring instruments have been developed and used in producing oil and gas wells but have not been developed for or used in conjunction with other necessary instruments and apparatus for fully testing and evaluating a formation.

The methods and apparatus available heretofore have not made possible the complete evaluation of reservoir properties and formation fluids at a series of different intervals in a drill hole without removing the drill pipe and test tools after each test, nor have they made possible a programmed series of production and shutin time periods having controlled production rates with continuous measurement of a multiplicity of fluid characteristics at the reservoir face during such a program. It is desirable to overcome these and other difficulties, and accordingly it is an object of this invention to provide an improved system for evaluating petroleum reservoir formations.

It is another object of this invention to provide an improved reservoir formation testing system for recording at the surface the measurements of a multiplicity of downhole instruments.

It is an object of this invention to provide a reservoir formation testing apparatus including downhole instruments and recording devices at the surface for recording during a testing procedure characteristics of the fluid produced from the formation which are sufficient to identify at frequent intervals the type of fluid or mixture of fluids produced.

It is another object of this invention to provide a reservoir formation testing apparatus including downhole instruments and a surface recorder for identifying the type of fluid produced from the formation, together with apparatus for continuing the production of fluid from the formation for an unlimited period of time until these recorded values are constant or sufficiently stable to indicate that the fluid being produced is free from excessive contaminants from the well.

It is another object of this invention to provide a reservoir formation testing system including downhole instruments and surface recorders therefor, together with apparatus for producing fluids from the formation being tested, in accordance with a predetermined program including a series of producing periods and shut-in periods (the producing periods having a controlled pattern of rate of flow or of pressure drawdown sufficient to afford accurate and complete interpretation of the reservoir properties from the instrument records.

It is another object of this invention to provide a system for securing a multiplicity of reliable and accurate readings of conditions or characteristics of fluid produced from a petroleum reservoir formation and for transmitting the readings without loss of accuracy to a computing station, thereby materially reducing the time required for full and effective evaluation of the formation.

It is a further object of this invention to provide a system for making a series of formation evaluation tests at selected intervals along a well bore without removing the string of drill pipe and testing equipment during the series of tests.

Briefly, in carrying out the objects of this invention in one embodiment thereof, a formation testing unit is provided which comprises an elongated housing in which are arranged a fluid pump and an instrument capsule containing sensing devices for determining a plurality of fluid characteristics to be measured. The pump and instrument capsule are arranged so that the produced fluid is circulated by the pump over the sensing devices in the capsule and is removed through a production conduit in the usual manner. In order to select the portion of the formation to be tested, straddle packers are employed and are expanded to shut off the selected portion of the formation from the well bore above and below. Successful straddle packers are available on the market and provide for the controlled expansion of the packing elements and for control of the passage of well fluids into the string from the formation. The several sensing devices in the instrument capsule are of the electric readout type and are electrically connected to a recording apparatus at the surface. These signals supplied by the read-out devices may be any one of several types including voltages proportional to the value sensed, electric pulses spaced a distance proportional to a value sensed, and alternating voltages at frequencies proportional to the values sensed. A recording device for making a graphic or analog record may be provided at the well head for immediate reading of the signals at the well head.

The recording apparatus at the surface further includes gating and counting circuitry for digitizing the signal information received and for recording the digitized information on a suitable medium such as a punched tape, any necessary coding equipment for this recording operation being included in the circuitry.

The recorded information may readily be transmitted from the well head to a central office where a computer may be employed to utilize the digitized and coded information for immediate determination and evaluation of information dependent upon the values recorded. By securing sufficient information in this manner, the fluid content of a reservoir and the producing characteristics of a formation may be determined with a high degree of accuracy; it also becomes possible to determine the probable limits or extent of the reservoir. The information thus secured may then be evaluated and the resulting complete information and evaluation of the formation forwarded by any suitable high-speed transmission system such as the teletype to the offices of the operator or owner of the property for immediate use.

The features of novelty which characterize the invention are pointed out with particularity in the claims attached to and forming a part of this specification. The invention itself, however, both as to its organization and method of operation, together with further objects and advantages thereof, may best be understood by reference to the following description taken in connection with the accompanying drawings in which:

FIG. 1 is a diagrammatic illustration of a cross section of a well bore and derrick equipment employing an apparatus embodying the invention;

FIG. 2 is an enlarged view, partly in section, of the donwhole portion of FIG. 1;

FIG. 2A is a sectional view illustrating a form of pump suitable for use in the downhole unit of FIG. 2;

FIG. 3 is an enlarged diagrammatic illustration of the instrument portion of the downhole apparatus, together with a block diagram of the electric circuitry thereof; and FIG. 4 is a schematic circuit diagram of a switching arrangement employed in the apparatus.

Referring now to the drawings, FIG. 1 illustrates a reservoir formation 10 in which a well bore 11 has been drilled. A test apparatus or assembly 12 embodying the invention is located in the bore 11, its having been lowered on drill pipe or tubing 13 from a derrick and tube pulling unit 14. The unit 12 includes a pair of upper and lower straddle packers 15 and 16 for isolating a portion of the formation between them and affording passage of fluids from the selected portion of the formation into the pipe or tubing through a perforated pipe section 17 in the well-known manner. The straddle packing equipment includes an arrangement for shutting off the well bore below the packer 16, the shutoff control being arranged within a stem portion 18 of the packer equipment. Above the packer 15 and communicating with the tube 17 through a connection 20, there is provided a formation testing unit 21 which includes a pump for producing fluid from the zone between the packers and an instrument package for sensing a plurality of characteristics of the produced fluids. The sensing devices are of the electric read-out type and are connected through a suitable electrical cable or wire line (not shown in FIG. 1) to recording equipment at the surface including a control and receiving unit 22 at the well head connected by a suitable transmission system 23 to a data receiving and computing unit 24 which may be remotely located and which, in turn, is connected by an information transmitting system 25 to the offices of the well owner or operator designated 26. A wire pulling unit indicated at 28 in FIG. 1 may be of any suitable type such as that in common usage for electric logging and is employed to lower and raise the instrument capsule 32 in the drill pipe 13.

The test apparatus 12 is shown in further detail in FIG. 2 which is an enlarged view with a portion of the pump and instrument unit 21 of the assembly partially broken away to show the interior thereof. The unit includes a central passageway 27 extending longitudinally entirely through the unit in communication with the string 13 above and the connection 20 below. An adjustable speed pump for producing the fluid from the formation is arranged in the annular space between the passage 27 and the outer wall of the unit 21. The pump may be driven electrically, mechanically, or hydraulically. The details of construction of the pump driving mechanism have not been shown as they are not essential to an understanding of the present invention. In the illustrated embodiment of the invention, the pump is provided with a series of intake ports 30 in the lower portion of the unit 21 and a series of discharge ports 31 in the upper portion. FIG. 2A illustrates, by way of example, one form of pump suitable for use with the present invention. This pump is of the internal helical gear type and comprises a rigid metal rotor 13b connected for rotation by the tube 13a, the rotor being hollow to provide a passage corresponding to the passage 27 in FIG. 2. The external element of the pump comprises a stator 21b formed of internal helical configuration and comprising a synthetic plastic body securely bonded to the inner walls of the casing 21a. When the central passage is closed by the capsule 32, relative rotational movement of the rotor 13b and stator 21b produces a positive displacement of fluid from the intake port indicated at 30a at the bottom of the pump to discharge port indicated at 31a at the top.

Referring again to FIG. 2, the intake and discharge ports 30 and 31 provide communication between the central passage 27 and the annular space between the walls of the passage and the cylindrical housing of the unit 21. The passage 27 is closed between the ports 30 and 31 by an instrument containing capsule or package 32 which engages an O-ring seal 33 and has a portion or chamber 34 extending downwardly into the lower portion of the passage 27 and within the connection 20. The capsule rests against a shoulder 27a near the bottom end of the passage 27, and the portion 34 is provided with openings near each of its ends to afford circulation of liquid therethrough in a manner to be described below. The liquid moving through the chamber 34 passes over a series of conditions-sensing devices or elements arranged in the chamber within this portion. The upper portion of the capsule 32 contains motors, switching equipment, and the like, as well as weights or ballast. The capsule 32 is lowered through the drill string on an electric wire line 35 which connects the sensing devices in the capsule 32 to the recording instruments at the well head. It will now be apparent that, when the pump within the unit 21 is in operation, liquid may be produced from the selected area of the formation 10, the liquid flowing into the tube or connection 17 through perforations 37 and entering the connection 20 and lower end of the tube 27, and thence flowing through the sensing element chamber 34 and into the pump through the intake ports 30, thence upwardly through the unit 21 at a substantially constant rate under control of the pump, and out through discharge ports 31 into the drill pipe 13. The sensing elements in the chamber 34 are thus immersed in the production fluids and are responsive to the conditions of the fluid passing therethrough. The rections of the passage 27 above and below the capsule 32 are separated by the O-ring seals 33 which as shown are located on an annular shoulder 38 formed in the walls of the passage 27 above the ports 30.

The arrangement of the capsule 32 so that the sensing devices are located in the path of the fluid produced from the formation by operation of the pump is an important feature of this invention. While the invention has been disclosed in connection with a pump arranged in an annular space about a central passageway, it will readily be understood that other types of pumps may be employed and that the chamber or passage containing sensing elements may be of constructions other than that illustrated, provided that the flow of produced liquid under control of the pump is directed over these elements during the operation of the pump. The pump speed is adjusted to secure the various rates of fluid production required by the particular test program. Some elements such as pressure sensing elements need not be in the flow path but must be in direct fluid communication with the fluid in the formation being tested without the intervention of any valves or fluid blocks. The construction illustrated, wherein the testing unit is provided with a central passage, greatly facilitates the testing operation by affording easy insertion and removal of the instrument capsule. For some applications, however, this feature may not be required, and other unit constructions may be more desirable.

The details of construction of the instrument package 32 are more clearly indicated in FIG. 3 which illustrates diagrammatically a portion of the walls of the unit 21 and connection 20 with the capsule in position against the shoulder 27a. In this figure the portion or chamber 34 has been shown as provided with inlet ports 39 at its lower end and discharge ports 41 adjacent the ports 30 just below the annular shoulder 38, the ports 41 communicating with the ports 30 when the capsule 32 is in position against the shoulder 27a.

The sensing devices within the chamber 34 have been indicated diagrammatically as comprising two spaced electrodes 42 and 43 used for measuring resitivity, a temperature sensitive coil 44, a density measuring device 45 which may be of the gamma-ray type, a spinner-type flow-rate measuring device 46, an ion identification sensing element or device 49 employing two electrodes, one of which is a calomel electrode 49a, and a pressure measuring device of the Bourdon tube type indicated at 47. The device 49 may be provided to sense pH value, eH value, or chloride ion content of the fluid, depending on the specific material used for the second electrode. In addition to these devices, a pressure differential sensing device 48 is provided having sensing ports 50 and 51 spaced a substantial distance which may be on the order of five feet from one another to measure dynamic pressure differentials during flow and static pressure differences during shut-in periods. In the upper portion of the capsule 32 there is provided a motor 53 which is driven synchronously with equipment at the surface to scan variably spaced contacts (not shown) associated with the Bourdon tube 47, the spacing of which contacts is proportional to the pressure registered by the tube.

Above the motor 53 within the capsule 32 there is arranged a switch and control housing 54 which is provided to scan the several sensing devices in the chamber 34 and to read out the electrical outputs of these devices and supply them selectively to the recording apparatus at the surface. The cable 35 includes at least three electric conductors for the purpose of transmitting data, supplying power, and supplying switching control voltages. The cable 35 is connected to a control and programming switch 55 of the control unit 22 indicated by a dotted outline, and the switch 55 is provided with timing pulses or synchronizing power from a unit 56. Unit 56 is precisely timed and assures the operation of all components of the system in required synchronism. Depending upon the connections established by the switching units 54 and 55 which may, for example, be operated in synchronism by stepping solenoids or motors energized by timed pulses from the timing unit 56, connections are made successively in selected order to a first gating circuit 57, a second gating circuit 58, a resistance-to-voltage conversion unit 59 and a voltage-to-frequency unit 61. The voltage supplied from the unit 59 is proportional to the resistances of certain of the sensing elements in chamber 34 and is supplied to the voltage-to-frequency converting unit 61 which generates a frequency proportional to the voltage and supplies this frequency through gating circuit 58 which opens for a precise period under control of a timer 56 to a counter 62 where the number of cycles of this frequency which occur during the precise time period when gate 58 is open are counted. Read-out signals which are voltages are impressed directly on the voltage-to-frequency unit 61 and the resulting frequency counted during the respective period the gate 58 is open. Certain of the condition-sensing elements, and particularly the spinner element 46, supply a series of voltage pulses, the frequency of which is proportional to the rate of flow measured. This frequency is supplied directly from the control switch 55 to the gating circuit 58 and thence to the counter 62 which counts the number of pulses occurring within the same given timed period determined by the timer 56. The pressure sensing tube 47 and scanning motor 53 produce a series of pairs of pulses, the pulses of each pair being spaced in proportion to the pressure reading at the time they are produced, and these pulses are supplied by the switch control 55 to open and close the gating circuit 57, thereby controlling the number of pulses or cycles of a predetermined constant frequency supplied by the timing generator 56 which are counted in counter 62 during the gating period. Thus, all of the electrical read-out signals from the devices in the capsule 32 are voltages, pulses or frequencies and appear as digitized signals at the output of the counter 62. The details of construction of the various sensing elements employed and indicated diagrammatically as mounted within the chamber 34 are not essential to an understanding of the invention. It should be understood, however, that these elements are selected to read accurately the desired fluid conditions sensed thereby so that the signals transmitted to the control 22 are precise and afford a rapid succession of indications on a repetitive cycle of the actual conditions or characteristics of the fluid produced from the selected portion of the reservoir. By digitizing all of the signals through operation of the counter 62, signals are provided which may be transmitted through a code converter 63 which codifies the signals and supplies them to a recording instrument 64 which may be a tape printer or punch. In addition to the signals received from the downhole capsule 32, it is desirable to introduce certain identification data and other information manually, and a manual signal apparatus 65 is provided for this purpose, its output being supplied to the code converter 63 for coding and recording. The printed or punched tape may then be employed to operate a transmitter indicated at 23, and the coded information may be supplied thereby to a remote computer 24 for calculating various types of information available from the data supplied; this enables the personnel at the computer station to evaluate accurately the characteristics of the reservoir formation under test and then to transmit this information through a code transmitter or other suitable device 25 to the ultimate user such as the operator or owner as indicated at 26.

Because complete information as to a wide range of fluid conditions or characteristics may be secured, recorded, and evaluated continuously and concurrently, highly accurate and prompt information may be supplied for the purpose of conducting further drilling, well completion, or production operations and also for evaluating the field in which the well under investigation is located, and also for evaluating the adjacent or nearby acreage. Furthermore, because the values of different conditions, for example temperature and pressure, are sensed substantially concurrently during each scanning cycle and since such values are related to one another and vary simultaneously, the multiplicity of available readings affords a ready means for utilizing or interpreting the readings of the instruments in accordance with their calibrations. The testing apparatus thus acquires all data required for utilizing the calibration of each instrument.

FIG. 4 illustrates diagrammatically the arrangement of the switch mechanism 54 and control and programming switch 55. These mechanisms are essentially scanning switches having rotating arms 71 and 72, respectively, for movement into contact with a series of 12 contact points in the switches illustrated. The circles 73 and 74 represent, respectively, insulating discs on which the contacts of the devices 54 and 55 are mounted. Each of these contacts is connected electrically with a respective sensing element, the elements 42 and 43 being shown connected to a contact 75, the element 44 to the contact 76, the element 46 to the contact 77, and a short-circuit connection 78 being provided at the contact 79. The short-circuit connection is provided in order to check the condition of the electrical lead between the arm 71 and the arm 72. The various other sensing devices are connected to others of the contacts, and the arms 71 and 72 are rotated in synchronism so that each of the devices connected to a contact on the switch 54 will be connected through the switch 55 to a corresponding contact and thence to the required one of the devices 57, 58 and 59 for conversion and digitizing of the read-out signals. The switch arms 71 and 72 may be rotated continuously in synchronism for providing a successive group of signals corresponding to the read-out signals from the several devices in order. The arms 71 and 72 may also be actuated to specific read-out-positions for checking each sensing device separately.

Information as to the viscosity of the fluids in the reservoir may be secured by measuring the density of the fluid, its dynamic pressure differential, and its rate of flow. The density may be determined directly by an instrument such as indicated at 45 which may be a gamma-ray detector, or it may be determined by sensing the static differential pressure by means of the instrument 48 operating during shut-in period. In either event, the calculation of the viscosity from the information thereby secured is effected through operation of the computer 67. The testing apparatus therefore also constitutes a viscosimeter.

During the normal operation of the apparatus and system just described when it is desired to conduct tests of a reservoir formation, the pump assembly 21 is attached to the straddle packers including the packers 15 and 16 in the manner indicated in FIG. 2. The assembly is then placed in the well bore, and successive stands of drill pipe are added above the pump until the straddle packer assembly is lowered to the depth of the formation at which the tests are to be conducted. The packers are then expanded and locked in position. The instrument capsule 32 is then lowered through the drill pipe on the electric wire line 35 until it reaches its seat against the shoulder 27a, as shown in FIG. 3. The drill pipe is then opened to the selected section of the formation through the perforations 37. The pump is then operated, and fluid is pumped out of the formation through the chamber 34 of the instrument assembly and into the drill pipe above the pump. The pump is operated at a controlled production rate for a length of time sufficient to assure the securing of a true sample of the formation fluid. In determining the period of operation for this purpose, the recording downhole instruments are observed until fluid characteristics such as density, resistivity, and ion content attain a constant value. When these values are observed to remain constant over a substantial period of time, the operator is assured that the mixture of formation fluid contaminated with well-bore fluids has been removed and that a true sample of formation fluid is being produced. The identity of the formation fluid thus produced can be determined by interpretation of the readings of the multiplicity of surface-recording downhole instruments which measure fluid characteristics such as resistivity, density, chloride ion content, and pH value.

A series of controlled production tests and shut-in periods may be programmed so that the instrument records will provide the maxium useful information as to the reservoir characteristics of the formation being tested. During each of the series of production tests, the pump operation may be controlled to give a desired fluid production rate pattern or desired pressure drawdown pattern. The instrument records acquired through the controlled production periods and the shut-in periods set forth in the predetermined program provide the basic data for predicting the reservoir's productive capabilities, including such information as the initial productivity, size or limits of the reservoir, the proximity to fluid barriers, multiphase production ratios, and other pertinent properties of the reservoir, knowledge of which is desired for making decisions as to the disposition of the well. Furthermore, these instrument records supply the data on true formation fluid pressure and formation fluid characteristics which are useful in geological studies and exploration programs throughout the surrounding area.

All data are recorded in digital form and therefore may be transmitted without loss of accuracy by teletype, dataphone, radio, or other communication system from a transmission point at or near the well site to a centralized computer facility.

A high-speed computer may be used to facilitate the complete calibration of all instruments to obtain maximum data accuracy and to interpret fully all fluid and reservoir parameters from the data made available by this apparatus. The results of computer interpretation and evaluation can, in turn, be transmitted by like means back to the well site or to any of the well owners' offices.

The provision of the central passage to secure clear access from the drill pipe to the packer assembly is not essential for all testing and recording apparatus embodying the invention; however, this construction makes possible an efficient apparatus for use in the event fracturing, acidizing, or other treatment of the formation is desirable because it can be employed directly to conduct such treatments.

If interpretation of the instrument data indicates that fracturing, acidizing, or other formation treatment could improve the producing characteristics of the reservoir, then the instrument chamber may be lifted from its seated position and removed from the well, whereupon treating fluid may be pumped down through the drill pipe and through the central passage of the pump and out into the portion of the formation between the packers of the straddle packer assembly. After completing the treatment, the instrument chamber may be seated again and the pump then operated to produce a programmed series of production and shut-in periods to evaluate fully the results obtained from the treatment.

After completing the full evaluation of the selected formation interval, the instrument chamber is removed from the hole and the straddle packers released and moved up the hole to a second selected portion of the formation to be tested. Here the packers are reseated, the instrument chamber is returned, and another set of tests is conducted. This method of operation of the apparatus and system of this invention provides a series of tests of several selected formation intervals which may thereby be fully evaluated and treated without removing the drill pipe, pump and packer assembly from the hole between the testing operations at the several intervals.

While this invention has been described in connection with specific types of apparatus and elements, various modifications and other applications will occur to those skilled in the art. Therefore, it is not desired that the invention be limited to the details of construction and arrangement illustrated and described, and it is intended by the appended claims to cover all modifications within the spirit and scope of this invention.

We claim:

1. A reservoir formation testing system comprising a combined fluid pump and instrument supporting unit having a housing adapted to be moved along a well bore, said unit having a passage extending therethrough and said pump being outside said passage and having its intake in communication with said passage for producing a controlled flow of fluid through the portion of said passage below said intake, means for isolating a predetermined section of the reservoir wall of a bore hole in which said unit is located and including conduit means for directing fluid produced from said section into said portion of said passage below said intake whereby the fluid flows upwardly through said unit upon operation of said pump, a removable instrument assembly movable through said passage into a position adjacent said pump intake, said assembly including a plurality of fluid condition responsive sensing elements located in the path of fluid flowing through said portion of said passage toward said pump intake when said assembly is in said position, means including a portion of said assembly for closing said passage above said intake and rendering said pump effective to produce a flow of fluid upwardly through said portion of said passage over said sensing elements, and sensing signal utilizing apparatus connected with said elements.

2. A reservoir formation testing system as set forth in claim 1 wherein said passage extends longitudinally through said housing centrally thereof, said pump being arranged in said housing about said passage and having a discharge port spaced from said intake and communicating with said passage, and said closing means being positioned between said ports.

3. A reservoir formation testing system comprising a combined fluid pump and instrument supporting unit having a housing adapted to be moved along a well bore, said unit having a passage therethrough and said pump being positioned outside said passage and having spaced intake and discharge ports communicating with said passage for producing a controlled flow of fluid through a portion of said passage below said intake port, means for connecting said unit to a tubing for receiving the fluid output from said pump, means for isolating a predetermined section of the reservoir wall of a bore hole in which said unit is located and including means for directing fluids produced from the predetermined section into said portion of said passage, a removable instrument capsule movable through the production tubing and into said passage, means in said unit for retaining said capsule in a predetermined position in said passage, said capsule including a portion extending into said portion of said passage between said pump intake and said predetermined section and said portion of said capsule having ports for affording passage of fluid therethrough, a plurality of fluid condition responsive elements arranged in said portion of said capsule, read-out devices in said capsule connected with said condition responsive elements, and signal utilizing apparatus connected with said devices for indicating the signals read out from said devices.

4. A reservoir formation testing apparatus comprising a combined fluid pump and instrument supporting unit having a housing adapted to be moved along a well bore, said unit having a passage therethrough and said pump being outside said passage and having an inlet and an outlet communicating with said passage at spaced points therein for producing a controlled flow of fluid into said passage, means for connecting said unit to a tubing for the discharge of fluid from said pump and for conducting the fluid to the surface, means including an instrument capsule movable through said tubing and into a predetermined position in said passage for closing said passage between said inlet and outlet thereby rendering said pump effective to draw fluid into said passage and to force the fluid from said inlet through said outlet and upwardly through said tubing, at least one fluid condition responsive element carried by said capsule in a position located below said intake when said capsule is in said predetermined position, and means on said capsule for directing the produced fluid over said element and toward said intake whereby said element senses the condition of such fluid.

5. In a reservoir formation testing apparatus, a combined fluid pumping and instrument supporting unit having a housing adapted to be moved along a well bore, said unit having a passage therethrough and including a pumping means outside said passage and having its intake in communication with said passage for producing a controlled flow of fluid into said passage, means for connecting said unit to a tubing for the discharge of fluid from said pumping means and for conducting the fluid to the surface, means including an instrument capsule movable through said tubing and into a predetermined position in said passage for closing said passage above said intake thereby rendering said pumping means effective to draw fluid into said passage from below said capsule and to force the fluid upwardly through said tubing, at least one fluid condition responsive device including a condition sensing element carried by said capsule, and means for directing the produced fluid over said element and toward said intake whereby said element senses the condition of such fluid.

6. In a reservoir formation testing apparatus, a combined fluid pumping and instrument supporting unit having a housing adapted to be moved along a well bore, said unit having a passage therethrough and including a pumping means outside said passage and having its intake in communication with said passage for producing a controlled flow of fluid into said passage, means for connecting said unit to a tubing for the discharge of fluid from said pumping means and for conducting the fluid to the surface, means including an instrument capsule movable through said tubing and into a predetermined position in said passage for closing said passage above said intake thereby rendering said pumping means effective to draw fluid into said passage from below said capsule and to force the fluid upwardly through said tubing, at least one fluid pressure responsive device including a pressure sensing portion carried by said capsule, and fluid conduit means for maintaining said pressure sensing element in communication with the fluid below said unit.

No references cited.

RICHARD C. QUEISSER, *Primary Examiner.*